(12) United States Patent
Gershfeld

(10) Patent No.: US 6,269,482 B1
(45) Date of Patent: Jul. 31, 2001

(54) METHODS OF TESTING ELECTRICAL SIGNALS AND COMPENSATING FOR DEGRADATION

(75) Inventor: Jack Gershfeld, Brea, CA (US)

(73) Assignee: Altinex, Inc., Brea, CA (US)

(*) Notice: Subject to any disclaimer, the term of this patent is extended or adjusted under 35 U.S.C. 154(b) by 0 days.

(21) Appl. No.: 08/892,347

(22) Filed: Jul. 14, 1997

(51) Int. Cl.[7] .................................................. H04N 1/173
(52) U.S. Cl. ........................ 725/107; 348/180; 348/192
(58) Field of Search .................................. 348/181, 104, 348/142, 186, 177, 180, 6, 10, 12; 324/121 R, 52, 512, 525; 725/107

(56) References Cited

U.S. PATENT DOCUMENTS

| | | | |
|---|---|---|---|
| 2,885,470 | * 5/1959 | Bartelink | 348/192 |
| 4,581,639 | * 4/1986 | Judge | 358/139 |
| 4,677,481 | * 6/1987 | Nicholas | 348/184 |
| 4,746,991 | * 5/1988 | Efron et al. | 358/335 |
| 4,914,506 | * 4/1990 | Kafer et al. | 348/182 |
| 5,005,197 | * 4/1991 | Parsons et al. | 379/21 |
| 5,532,765 | * 7/1996 | Inoue et al. | 348/180 |
| 5,596,364 | * 1/1997 | Wolf et al. | 348/192 |
| 5,801,953 | * 9/1998 | Thoma et al. | 345/145 |
| 5,808,671 | * 9/1998 | Maycock et al. | 348/180 |

OTHER PUBLICATIONS (Electronics Workbench, User's Guide; Interactive Image Technologies; Chapter 4), Jan. 1995.*

* cited by examiner

Primary Examiner—Andrew Faile
Assistant Examiner—Reuben M. Brown
(74) Attorney, Agent, or Firm—Vladimir Khiterer

(57) ABSTRACT

Methods of testing circuits for degradation of electrical signals and compensating for this degradation are disclosed. One such method involves visually comparing a visual representation of a reference signal generated by a test signal source, which can be made substantially identical to an original signal, and a degraded signal generated by another test signal source after passing through a video system. The degraded image is then adjusted to visually match the reference image. Another disclosed method involves converting a degraded signal that has passed through a video system into two substantially identical copies of said degraded video signal and then adjusting one of the two substantially identical copies of said degraded video signal to compensate for the degradation of the system while comparing it with the other substantially identical copy of said degraded signal which remains uncompensated.

11 Claims, 6 Drawing Sheets

METHODS OF TESTING ELECTRICAL SIGNALS AND COMPENSATING FOR DEGRADATION

BACKGROUND

The present invention is in the field of computer video systems. More particularly, the present invention relates to various methods of visually testing video systems for degradation of video signals that pass through video systems, as well as methods of compensating for this degradation.

Video systems may include a variety of video sources, including but not limited to computers, video cassette recorders, video cameras, and a variety of display devices, including but not limited to CRT monitors, CRT projectors, LCD projectors, DLP projectors, or other video display devices. The video sources can generate video signals of many types, including but not limited to NTSC, PAL, SECAM, as well as the types produced by computers, such as composite, monochrome analog, RGB, RGBS, RGBHV, RGsB, RsGsB, and any additional video standards developed by IBM for personal computer compatible technology, including but not limited to CGA, EGA, VGA, and SVGA type signals and any other standards developed by industry associations like VESA.

Regardless of the specific types of video signals produced, video signals frequently require processing and manipulation before they reach video display devices. To this end, video switchers, video distribution amplifiers and other equipment, as well as various types of interconnecting cables, are frequently installed between video signal sources and video display devices.

Those ordinarily skilled in the pertinent arts will recognize that after video signals pass through such video system and reach video display devices, the quality of the video signals frequently degrade. The degree and type of degradation of a video signal depends upon the characteristics of components of the circuits through which the video signal is passing. The number of components and the individual characteristics of these components, as well as the characteristics and length of interconnecting cables used to connect said devices together determine the video signal degradation level.

In order to determine the extent to which a particular circuit degrades a video signal, as well as to determine how to compensate for the degradation, it is necessary to compare the original video signal generated by the source, with the video signal received by a video display device after the video signal has passed through such circuit.

Conventionally, this is done by connecting a video display device to a video signal source and observing the original image generated by the original video signal on the screen of the video display device. The video display device can then be connected at the output of the video system and the degraded image generated by the video signal after passing through the video system can be compared to the original image before passing through the video system. A troublesome shortcoming of this method is that a person comparing these two images has to remember what the original image looked like because only one image is viewed at a time, and the original image is not displayed while the degraded image is observed.

It is also possible to use two monitors, one connected to the original video signal and displaying the original image and one connected at the output of the video system and displaying the degraded image. However, those skilled in the pertinent arts will recognize that this method requires close proximity between video signal sources and video display devices, which in many cases is not possible. In addition, different display characteristics of each monitor may provide inaccurate results. Alternatively, one can employ network analyzers which test video systems by measuring various bandwidth characteristics. However, those skilled in the pertinent arts will recognize that network analyzers, aside from being expensive, also require close proximity between video signal sources and video display devices, which in many cases is not possible. In addition, specially trained personnel are required to operate complex network analyzers, who are often in short supply, and expensive.

Accordingly, a clear need exists for an inexpensive and simple method of testing video systems for degradation of video signals that pass through video systems, as well as compensating for the degradation of the video systems in order to provide the highest quality image possible.

OBJECT AND SUMMARY OF THE INVENTION

The present invention is directed to methods of testing video systems and compensating for the degradation of those video signals after passing through the video systems, in which the methods meet the needs discussed above.

An additional object of the present invention is to provide a novel enhanced means of testing for degradation of signals and ameliorating same, which overcomes the drawbacks of the prior art.

A first improved method, which is the subject matter of this invention, comprises the steps of applying a first test video signal to an input of a video system (where computers, video cassette recorders, video cameras, or any other video signal sources are connected to the video system) in a way that images generated by a first test video signal are displayed only on a portion of a screen of a display device. This can be accomplished by a generator or any other means capable of generating signals which produce images only on portions of the screen, as opposed to images occupying the entire screen. The first test video signal is then passed through the video system and the image generated by the first test video signal, which has been subject to degradation, is displayed only on a portion of the screen of the video display device.

A second test video signal, acting as a reference signal, is generated substantially identical to the first test video signal. The second test video signal is designed so that the image it produces will be displayed on a portion of the screen not occupied by the signal from the first generator. The second test signal, along with the first test signal are synchronized and combined by a special circuit and connected to the video display device. Those ordinarily skilled in the pertinent arts will recognize that in order for the second test video signal to be substantially identical to the first test video signal, same can be, for example, calibrated to the first test video signal.

The image generated by the second test video signal, which has not passed through the circuitry that the first test signal has, therefore functions as a reference signal. The image of the second test video signal is then displayed only on a portion of the screen of the display device, other than that portion of the display device on which said degraded image is displayed. It is most convenient, but not necessary, to display the degraded image and the reference image side by side on the screen of the video display device. For example, the reference image can occupy the left side of the screen, and the degraded image can occupy the right side of the screen of the video display device. (Alternatively, the degraded image and the reference image can be displayed on top and bottom of the video display device.) By visually comparing the two images simultaneously displayed on different portions of the screen of the video display device, it is easy and convenient to determine the extent to which the video signal degraded after passing through the video system. It should be apparent to those skilled in the pertinent arts that both generators of test video signals used for this type of testing can have the ability of adjusting positions and sizes of images used for comparison.

According to a further feature of the present invention, there is provided an additional step of correcting the degradation of video signals by adjusting the degraded image while the reference image is simultaneously displayed on the screen of the video display device until the degraded image appears as close to the reference image as possible within the limitations of a particular video system, the limitations of a particular means of adjustment, and limitations of the particular video display device. Those ordinarily skilled in the pertinent arts will recognize that such adjustment can be accomplished, for example, by applying adjustments for compensating gain characteristics and frequency response of a video system.

In practicing this invention with video systems having multiple video signal sources, one may employ means of adjustment comprising memories for adjustment settings for different combinations of devices for processing and manipulating video signals and interconnecting cables. This permits selection (either manually or by signals from other devices) of a specific adjustment setting corresponding to a specific combination of devices for processing and manipulating video signals and interconnecting cables in a video system.

According to yet a still further feature there is provided another improved method, which is the subject matter of this invention, relates to adjustment of performance of video systems and does not require means of generating test video signals used in the first method described above. Instead, this method comprises the steps of passing a video signal through a video system and converting a degraded video signal that has passed through the video system into two substantially identical portions of said degraded video signal in a way that images generated by each of said identical portions of said degraded video signal can be displayed only on portions of a screen of a video display device, as opposed to occupying the entire screen of the video display device.

Those skilled in the pertinent arts will recognize that the degraded video signal can be converted into two substantially identical portions of same by means of, for example, a distribution amplifier. It should also be apparent that displaying portions of the degraded video signal on different portions of the screen of the video display device can be accomplished by means of switching one of the two portions of the degraded video signal to the video display device at the predetermined time. For example, one of said two substantially identical portions of the degraded video signal can be switched on during the first half of the horizontal deflection, and the other one can be switched on during the second half of the horizontal deflection of the video display device. This will cause the images generated by both substantially identical portions of the degraded video signal to appear on two different portions of the screen of the video display device.

A substantially identical portion of the degraded video signal is applied to the video display device in a way that the image generated by said first substantially identical portion of the degraded video signal (a degraded image) is displayed only on a portion of the screen of the display device. Second substantially identical portion of the degraded video signal is passed through a circuit means for adjusting performance of the video system and then applied to the video display device in a way that the image generated by said second substantially identical portion of the degraded video signal that has passed through the circuit means for adjusting performance (an adjusted image) is combined with said degraded image and displayed only on a portion of the screen of the video display device, different from the portion of the screen of said video display device on which said degraded image is displayed. In practicing this invention with video systems having multiple video signal sources, one may employ a means for adjustment comprising memories for adjustment settings for different combinations of devices for processing and manipulating video signals and cables.

This permits selection (either manually or by signals from other devices) of specific adjustment settings corresponding to specific combinations of devices for processing and manipulating video signals and cables.

It is most convenient, but not necessary, to display the degraded image and the adjusted image side by side on the screen of the video display device. For example, the adjusted image can occupy the left side of the screen, and the degraded image can occupy the right side of the screen. Said adjusted image is then adjusted while being compared to said degraded image simultaneously displayed on the screen of the video display device.

BRIEF DESCRIPTION OF THE DRAWINGS

The advantages of the present invention will become better understood with reference to the following description of preferred embodiments of the invention, appended claims, and accompanying drawing figures in which the same reference numeral indicates the same feature, or features which are analogous in structure or function.

DETAILED DESCRIPTION OF PREFERRED EMBODIMENTS OF THE PRESENT INVENTION

Throughout the following detailed description, it should be understood by those skilled in the pertinent arts, that references to electrical communication shall not be limited to communications performed entirely by electrical means, but shall be understood that some portions of the overall communications of the electrical signals may be performed by other means, including but not limited to optical, RF, ultrasound, magnetic, microwave, acoustic and other signals and means now known to those skilled in the pertinent arts or later developed.

Figure 1:
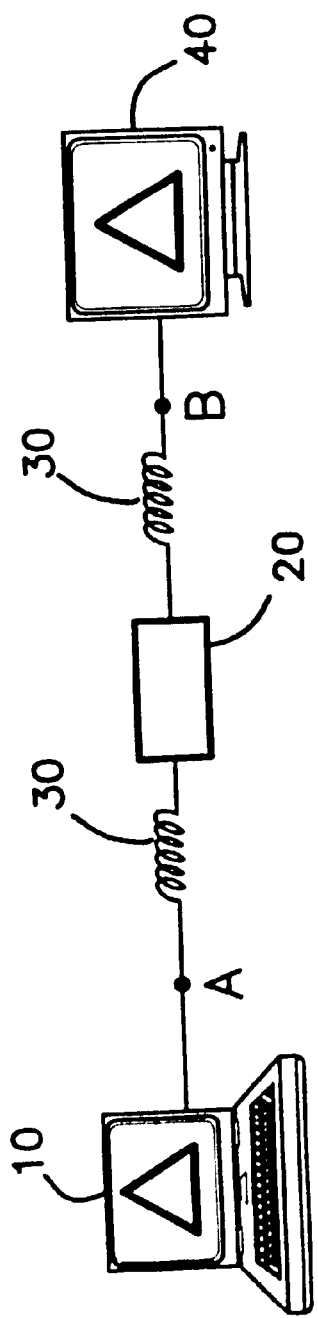
FIG. 1 provides a schematic presentation of a video system to which the methods embodying the present invention are applied.

The initial discussion of a preferred embodiment shall be made by reference to FIG. 1. Starting on the left hand portion of FIG. 1, there is initially provided a Video Signal Source 10 which is placed in electrical communication with the first end of Cable 30 at Junction A. Video Signal Source 10, which in this embodiment is shown as a computer, could be any number of other video sources producing a wide variety of types of video signals.

For example, Video Signal Source 10 could be a video camera, a video cassette recorder (VCR), a video tape recorder, a video disc player, a DVD, and any number of other video signal sources which are known to those ordinarily skilled in the pertinent arts. Cable 30 represents any number of possible means for conducting a video signal, including but not limited to a coaxial, fiber optic, and twisted pair cable. Cable 30 conducts the video signal from Video Signal Source 10 to Intermediary Circuit 20 which comprises any number of possible circuit elements. Intermediary Circuit 20 is generally composed of devices for processing and manipulating video signals, which may include distribution amplifiers, matrix switchers, interfaces and any number of other devices which are known to those ordinarily skilled in the pertinent arts.

The output of Intermediary Circuit 20 is placed in electrical communication with a second Cable 30, which conducts the video signal to Junction B which is in electrical communication with Video Display Device 40. The video signal generated by Video Signal Source 10 is displayed in some visual manner by Video Display Device 40. As shown in FIG. 1, Video Display Device 40 is a computer monitor, although other video display devices, such as TV monitors, projectors, LCD displays, DLP projectors, and a number of other devices are possible.

Junction A is usually located in close proximity to the Video Signal Source 10. Junction B is usually located in close proximity to the Video Display Device 40. All of the circuitry and cables located between Junction A and Junction B represent the circuit that is being evaluated. No electronic circuitry can perfectly duplicate or process a video signal. Thus the video signal present at Junction B will be in some manner degraded or inferior to the signal at Junction A which was generated by Video Signal Source 10. The method of the instant invention is used in conjunction with the circuitry, components and cables of the system shown in FIG. 1 and enable a person to visually estimate a level of degradation and compensate for the degradation and alteration of a video signal after passing through Intermediary Circuit 20.

Figure 2:
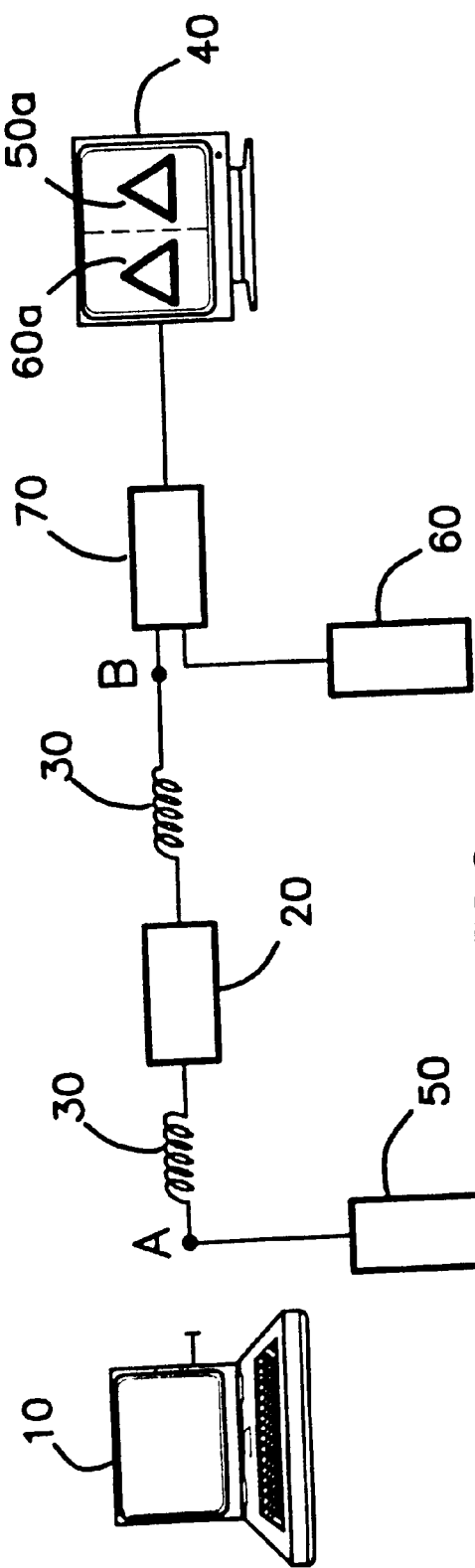
FIG. 2 provides a schematic presentation of the steps of testing video systems for degradation of signals by comparing reference and degraded images according to the present invention.

Referring now to FIG. 2, a method will now be explained which permits the basic circuit as shown in FIG. 1, to be evaluated. As part of the evaluation method described for FIG. 2 and all other figures, the normal video source is removed and a test signal is used for evaluation and for setting various compensation devices. Once these compensation devices have been set properly, the usual video source can be returned to the circuit, with the compensation device now providing for a high quality signal. Starting at the left side of FIG. 1, there is provided a Video Signal Source 10. However, in this test situation, Video Signal Source 10 has been removed from electrical communication at Junction A during the evaluation steps. Instead, First Test Generator 50, is placed in electrical communication with Junction A. First Test Generator 50 is capable of generating video signals which produce images only on selected portions of a video display screen, as opposed to producing images which occupying the entire screen. In addition, First Test Generator 50 is designed to produce signals that have characteristics identical to those produced by Video Signal Source 10.

The circuitry as shown in FIG. 2, between Junction A and Junction B, is identical to the circuitry between Junction A and Junction B as shown in FIG. 1.

However, in the circuit as shown in FIG. 2, Junction B is not placed in electrical communication with a video display device, but rather with Video Synchronizer 70. A Second Test Generator 60 is also placed simultaneously in electrical communication with Video Synchronizer 70.

Video Synchronizer 70 receives input directly from Second Test Generator 60 and indirectly from First Test Generator 50, after the video signal has been processed by the circuitry between Junction A and Junction B. Because the video signals generated are from different sources, they will not be synchronized when generated. The purpose of Video Synchronizer 70 is thus to not only combine the video signals but to synchronize them as well, so that they can properly displayed on Video Display Device 40. However, as should be apparent to those knowledgeable in the pertinent arts, it is simply more convenient, but not necessary to use one device, such as Video Synchronizer 70, for both synchronizing and combining video signals. Synchronizing can be accomplished by a variety of means. For example, First Test Generator 50 and Second Test Generator 60 can be connected to a separate means of synchronizing the video signals.

The output of Video Synchronizer 70 is placed in electrical communication with Video Display Device 40. First Test Generator 50 and Second Test Generator 60 are designed so that the signal from each of them is displayed on separate portions of Video Display Device 40. In FIG. 2, the signal that originated from First Test Generator 50 is shown as Image 50a. Image 50a represents a signal that has been degraded or altered by passing through the circuitry located between Junction A and Junction B. The signal that originated form Second Test Generator 60 is shown in the figure as Image 60A and represents an unaltered or reference image.

It is within the scope of the invention, that the video signals coming from First Test Generator 50 and Second Test Generator 60, can be modified so that each image that results from each signal, can be displayed in a plurality of sizes and in any possible position on the video display screen. This feature, though discussed here in reference to FIG. 2, this feature of the invention applies to all other embodiments, regardless of the source or origin of the displayed signal.

By observing Image 50a and Image 60a on Video Display Device 40, it is easy and convenient to determine the extent to which the video signal degrades after passing through the video system represented by the circuitry between Junction A and Junction B. Those ordinarily skilled in the pertinent arts will recognize that additional monitors, oscilloscopes or a number of other devices capable of displaying images generated by video signals can be connected instead of or in addition to the Video Display Device 40, for the purpose of observing and comparing the Image 50a and the Image 60a.

In short, FIG. 2 shows how the basic system as described in FIG. 1 can be modified to permit the visualization of a degraded video signal and a reference video signal simultaneously on the same video display device.

Figure 3:
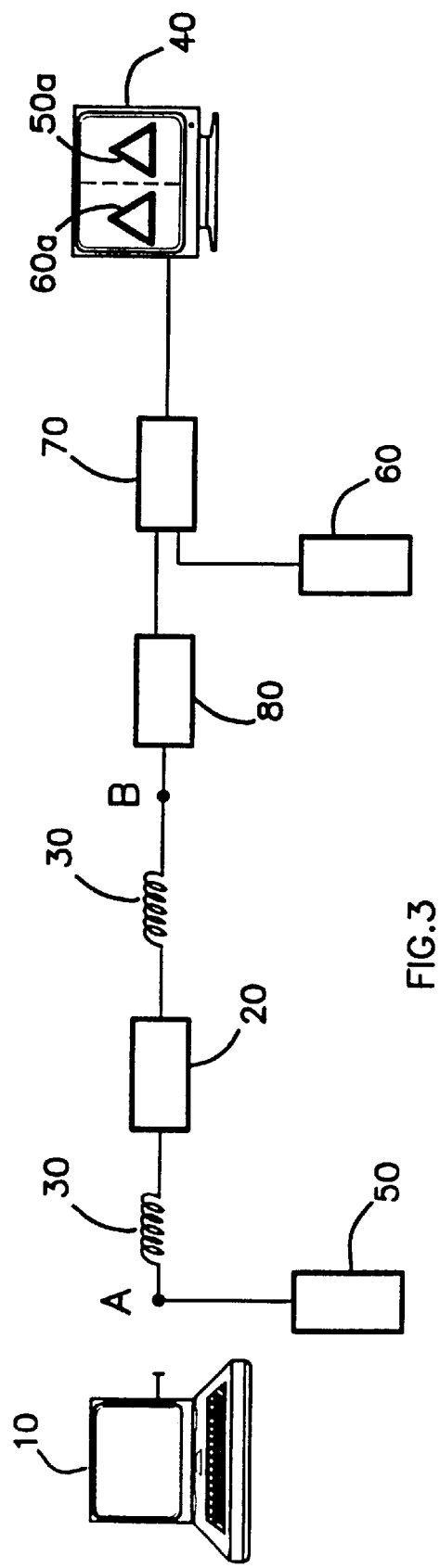
FIG. 3 provides a schematic presentation of the step of correcting degradation of video signals in addition to testing video systems for degradation of signals by comparing reference and degraded images according to the present invention.

Referring now to FIG. 3, it will be explained how to correct or compensate for the degradation that takes place in video circuit. The circuitry in FIG. 3 is identical to FIG. 2 with the single addition of Video Compensator 80 between Junction B and the one of the inputs to Video Synchronizer 70.

In review, First Test Generator 50 provides a signal that is conducted from Junction A to Junction B by passing through Intermediary Circuit 20. However, instead of being placed in electrical communication with Video Synchronizer 70, Video Compensator 80 is placed at Junction B to receive the video signal that originated with First Test Generator 50.

The output of Video Compensator 80 is placed in electrical communication with one input to Video Synchronizer 70, which also receives at a second input, a reference signal from Second Test Generator 60. The output of Video Synchronizer 70 is placed in electrical communication with Video Display Device 40.

Therefore, as in FIG. 2, there are two images, Image 50a and Image 60a, displayed on the Video Display Device 40. However, in this embodiment, there is a means to adjust or compensate the signal that originated from First Test Generator 50 so that it more closely matches the reference signal originating from Second Test Generator 60. Video Compensator 80 may utilize, for example, adjustments for compensating gain characteristics and frequency responses of video systems. By applying such adjustments, the Image 50a can be adjusted to appear as closely as possible to the reference Image 60a, within the limits of a particular video system and limits of a particular Video Compensator 80.

Figure 4:
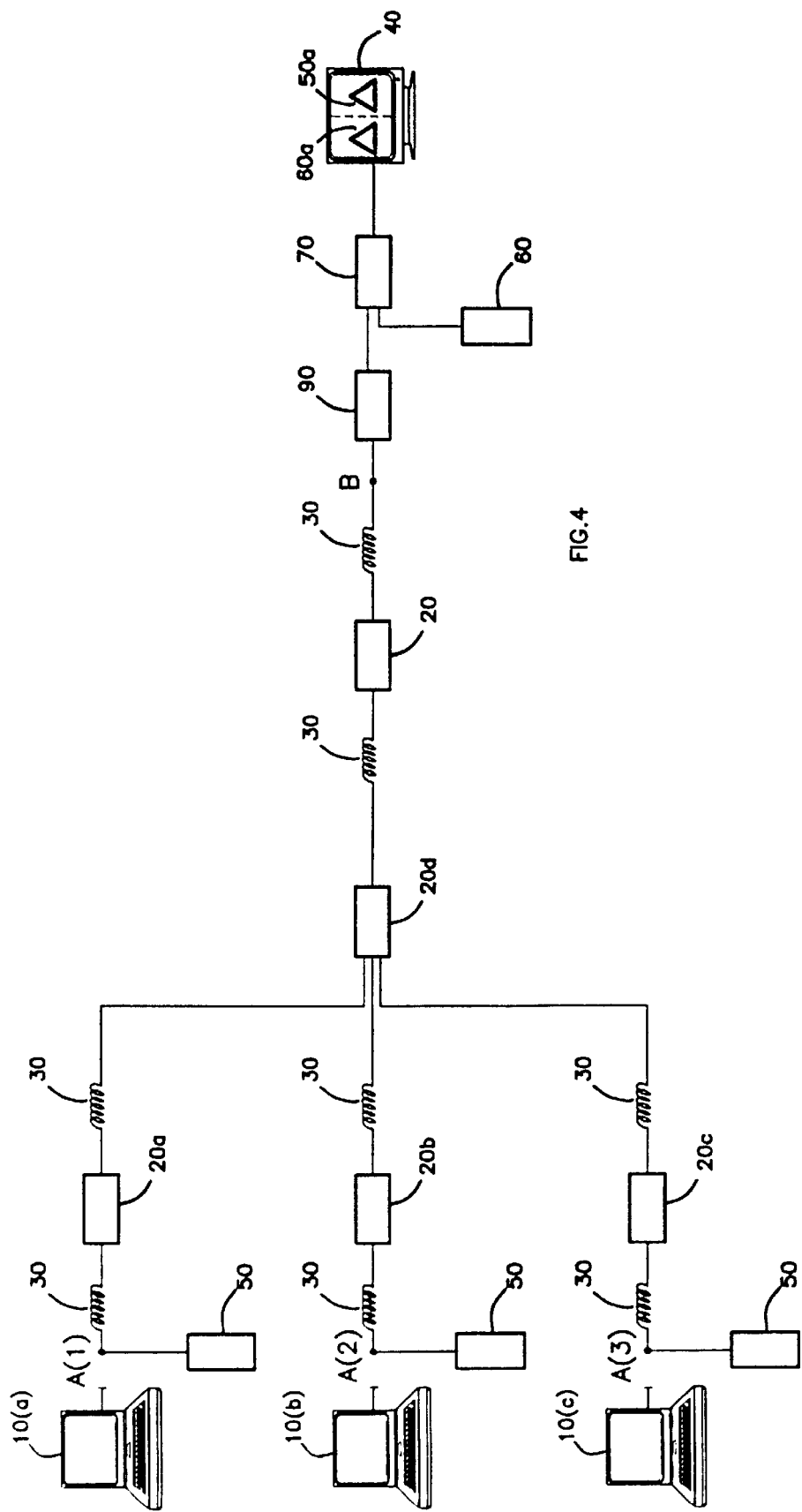
FIG. 4 provides a schematic presentation of the steps of testing video systems having multiple video signal sources for degradation of signals by comparing reference and degraded images and correcting the degradation according to the present invention.

The discussion of an alternative embodiment of the invention will make reference to FIG. 4, which details a common video distribution and display situation, in which there are a number of possible sources which may be switched and placed in electrical communication with a means for video presentation. Each video source will have some unique circuitry associated only with that video source. A single means for compensation for the degradation in the circuitry associated with one of the possible video sources, would have to be adjusted to a new set of parameters, each time the video source was changed. That situation can be remedied by having a video compensation device capable of storing and implementing a plurality of different settings, each one corresponding to the requirements for a particular video source and its unique associated circuitry and cables.

Referring now to FIG. 4, and beginning with the left hand portion of same, there are shown three sources of video signals, Video Signal Source 10(a), Video Signal Source 10(b), and Video Signal Source 10(c). Associated with each Video Signal Source, is a complete and separate set of the following components: First Test Generator 50, Cable 30 in a plurality of locations, and for each Video Signal Source there is a unique compilation of circuitry, Intermediary Circuit 20a, Intermediary Circuit 20b, and Intermediary Circuit 20c. Each combination of video source, cabling, Intermediary Circuit and further cables, vary in terms of distance from the Video Display Device 40 and particular circuit requirements for the individual Video Signal Source, and its type of signal. Each First Test Generator 50 is in electrical communication either Junction A1, Junction A2 or Junction A3. Because there are a number of various signal sources, each First Test Generator is calibrated to produce a signal having characteristics that match as closely as possible the corresponding video signal.

Though this figure shows three possible sources of video signals, this is done only for the purpose of having the figure scaled to a reasonable size for the purposes of illustration. There is no practical limit as to the number of possible video sources that could be included within the description as set forth herein.

The output of each Intermediary Circuit 20a, 20b, or 20c is placed in electrical communication with Video Switcher 20d.

Each of the three video signals is placed in electrical communication with the inputs of a video switch device, Video Switch 20d, which selects one of the inputs and places that one signal in electrical communication with additional Cable 30 and Intermediary Circuit 20.

Thus, the circuitry shown in FIG. 1 between Junction A and Junction B, is represented as one of three possible circuits, shown as the circuitry between Junction A1 and Junction B, Junction A2 and Junction B, or between Junction A3 and Junction B, depending on the state of Video Switch 20d.

The selected video signal, present at Junction B is then placed in electrical communication with Multiple Setting Compensator 90, which is a device similar to Video Compensator 80 except that it can store electronically or through mechanical means, multiple compensation settings and implement any particular setting by receipt of an electrical signal from another device or by simple mechanical switch selection.

Next the selected video signal is placed in electrical communication with Video Synchronizer 70 which also receives a reference video signal from Second Test Generator 60. The two video signals, firstly, the degraded signal which has passed through circuitry from Junction A1, A2 or A3 to Junction B, and secondly, the reference video signal provided by Second Test Generator 60 are combined and synchronized by Video Synchronizer 70 and placed in electrical communication with Video Display Device 40.

The image generated by the signal provided by First Test Generator 50 is presented on Video Display Device 40 as Image 50a and the imaged generated by the signal provided by Second Test Generator 60 is presented on Video Display Device 40 as Image 60a.

As in FIG. 3, the images generated by the two signals are designed so that the full image, though smaller size, is displayed twice, only on selected, non-lapping portions of the screen.

Figure 5:
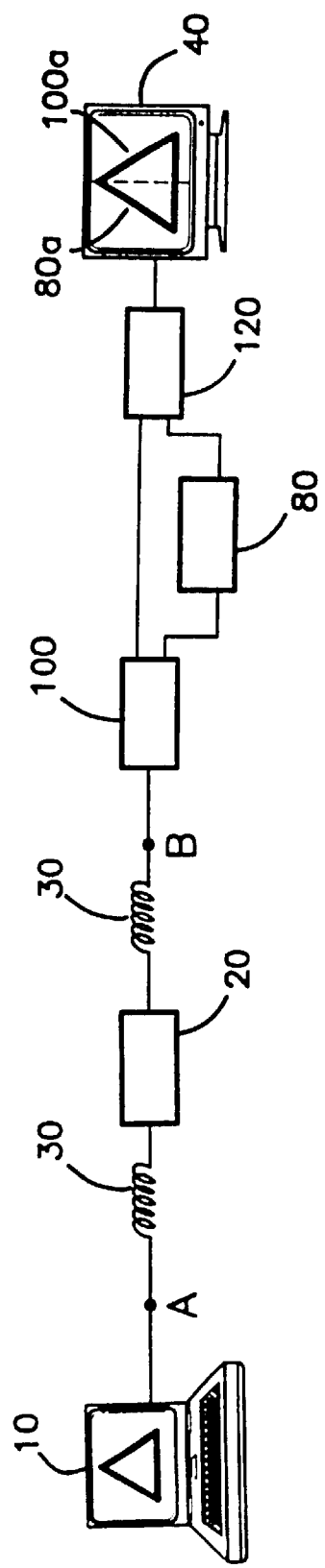
FIG. 5 provides a schematic presentation of the steps of adjusting performance of video systems by converting degraded video signals into two substantially identical portions of the degraded video signal, adjusting one of the two portions to improve performance of video systems while comparing degraded and adjusted images according to the present invention.

Yet another alternative preferred embodiment of the invention is shown in FIG. 5. Starting on the left hand side of the figure, the components shown up to Junction B are the same as those shown in FIG. 1. The Video Signal Source 10 is placed in electrical communication with Cable 30 at Junction A. Cable 30 conducts the video signal from Video Signal Source 10 to Intermediary Circuit 20. The output of Intermediary Circuit 20 is conducted to via Cable 30 to Junction B.

From Junction B, the signal is conducted to the input of Video Splitter 100, which duplicates the incoming signal into two essentially identical video signals as outputs. One of the video signals is placed in electrical communication with the first of two inputs to Video Combiner 120. The second output of the Video Splitter 100 is placed in electrical communication with the input to Video Compensator 80. The output of Video Compensator 80 is placed in electrical communication with the second input to Video Combiner 120. Because the two signals were created by the Video Splitter 100, they are already in synch, thus there is no need for a synchronizer function. The output of Video Combiner 120 is placed in electrical communication with Video Display Device 40. The portion of the video signal from Video Signal Source 10 is displayed on one portion of Video Display Device 40 and is represented as Image 110a. The portion of the video signal that has been conducted through Video Compensator 80 is displayed on the remaining portion of Video Display Device 40 and is represented as Image 100a.

However, in this embodiment, the whole image is presented on Video Display Device 40, with one portion of the image represented by the signal coming directly from the Video Splitter 100, and the other portion of the image is represented by the signal which has passed through the Video Compensator 80.

Thus, the operator can view simultaneously on Video Display Device 40 a portion of the image representing the portion of the video signal altered by the Intermediary Circuit 20 and that portion of the image represented by the altered video signal after having been modified by the settings in Video Compensator 80. Thus the operator can view the fully degraded signal while making adjustment to the settings in Video Compensator 80 and viewing the effects that those adjustment settings have on the Image 100A.

Figure 6:
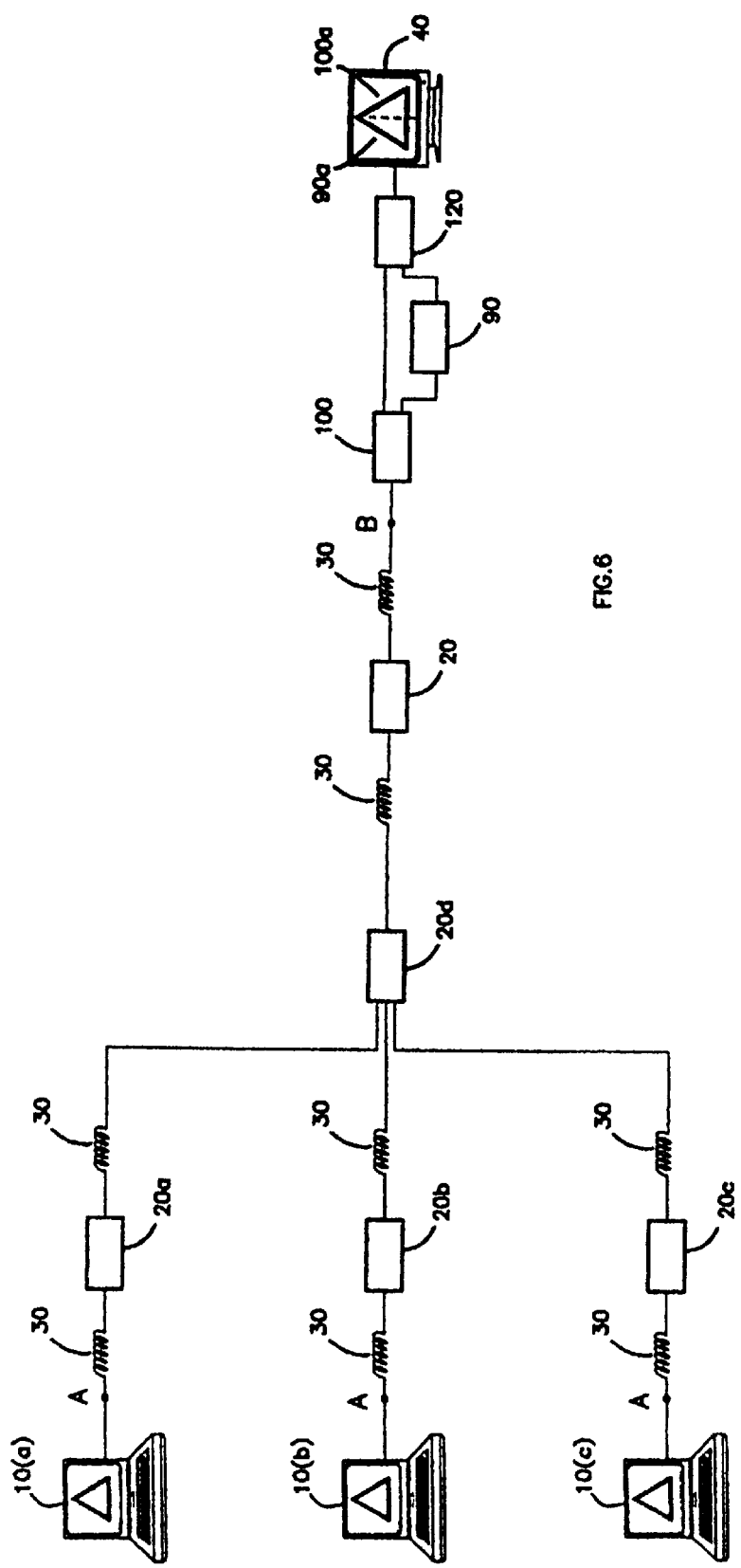
FIG. 6 provides a schematic presentation of the steps of adjusting performance of video systems having multiple video signal sources by converting degraded video signals into two substantially identical portions of the degraded video signal, adjusting one of the two portions to improve performance of video systems while comparing degraded and adjusted images according to the present invention.

Referring now to FIG. 6, there is shown a previously described circuit arrangement in which there are multiple sources of video signals and associated circuitry. One of these multiple sources at a time is switched, so that it will be presented on the video display device. In practice, each possible source is switched one at a time into the circuit, the signal is split after having passed through the Intermediary Circuits, a portion is conducted to a compensation device and the two signals are shown simultaneously on a video display device. A technician will make adjustments to the compensation device to compensate for degradation in the signal. These settings are stored together in the multiple setting compensation device in manner that associates these particular settings with the particular video source being compensated.

Then in sequence, each of the other video sources and related circuitry, are switched in to the circuit, a new group of settings are determined for the new video source and those new settings are stored together in the multiple setting compensator. After all settings have been determined, then when a particular video source needs to be used, the multiple setting compensator is switched to the settings corresponding to that video source and the signal will be corrected and compensated in the manner that has been previously determined to be efficacious for this video source. After all adjustments have been completed, the compensated image can be displayed on the entire screen of the display device.

Starting on the left hand portion of FIG. 6, there is shown three sources of video signals, Video Signal Source 10a, Video Signal Source 10b, and Video Signal Source 10c. Associated with each Video Signal Source, is a complete and separate set of the following components: Cable 30 in a plurality of locations, and for each Video Signal Source there is a unique compilation of circuitry, Intermediary Circuit 20a, Intermediary Circuit 20b, and Intermediary Circuit 20c. All of these circuits which vary in length and character of the various Cable 30 used in a particular circuit and make up of components in Intermediary Circuit 20.

Though this figure shows three possible sources of video signals, this is done only for the purpose of having the figure be a reasonable size. There is no practical limit as to the number of possible video sources that could included within the description as set forth herein.

Each of the three Intermediary Circuits 20 is placed in electrical communication with one of the three inputs into Video Switch 20d. The output of Video Switch 20d is connected to Intermediary Circuit 20 by Cable 30 and Intermediary Circuit 20 is placed in electrical communication with Video Splitter 100, which divides the incoming signal into two essentially identical video signals, each signal carrying a portion of the video image.

The first of the two outputs is placed in electrical communication with the first of the two inputs to Video Combiner 120. The second of the two outputs is placed in electrical communication with the input to Multiple Setting Compensator 90. The output of Multiple Setting Compensator 90 is placed in electrical communication with the second input of Video Combiner 120.

The output of Video Combiner 120 is placed in electrical communication with Video Display Device 40.

The portion of the video signal from Video Signal Source 10 is displayed on one portion of Video Display Device 40 and is represented as Image 100a. The portion of the video signal that has been conducted through Multiple Setting Compensator 90 is displayed on the remaining portion of Video Display Device 40 and is represented as Image 90a.

As a further embodiment, it is possible to combine features from other methods. This embodiment combines the features of utilizing a reference signal along with the splitting of the degraded signal and compensating one of the split degraded signals.

Figure 7:
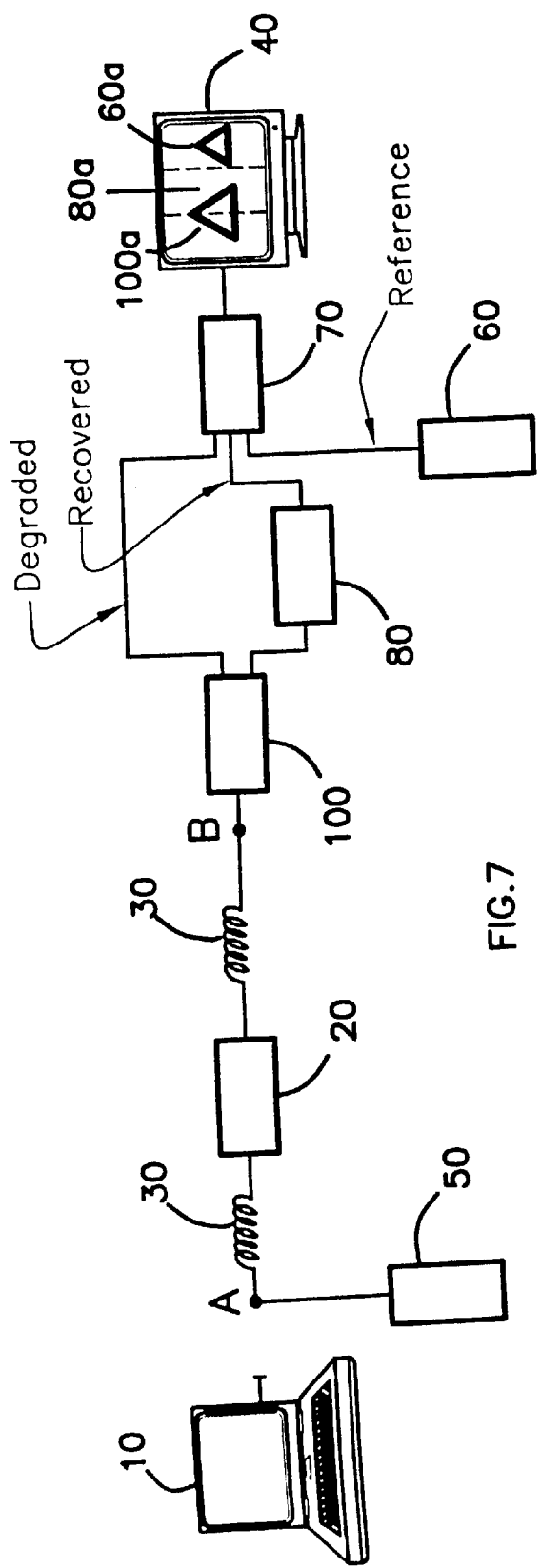
FIG. 7 provides a schematic presentation of a modification of FIG. 2, in which the original signal is split and one of the signals is routed through a compensation device. Ultimately there are three signal representations presented on the video screen, the original degraded signals, a modified or recovered signal, and a reference signal.

Making reference to the left hand side of FIG. 7, the circuit is the same as FIG. 2 up to Junction B. Starting from Junction B, the signal is placed in electrical communication with Video Splitter 100.

Video Splitter 100 generates two signals identical in characteristics to the degraded signals which are present at the input of Video Splitter 100, except that one signal represents the left hand portion of the image and the other signal represents the right hand portion of the image.

The first of the outputs from Video Splitter 100 is placed in electrical communication with Video Synchronizer 70, which has at least three inputs and one output.

The second output from Video Splitter 100 is placed in electrical communication with the input of Video Compensator 80. The output of Video Compensator 80 is placed in electrical communication with the second input of Video Synchronizer 70.

Second Test Generator 60 is provided, which produces a video signal having characteristics which are identical to First Test Generator 50. The output of Second Test Generator 60 is placed in electrical communication with the third input to Video Synchronizer 70.

Video Synchronizer 70 combines and synchronizes the video signals from the three sources. The output of Video Synchronizer 70 is placed in electrical communication with Video Display Device 40.

Thus, the output from Video Synchronizer 70, when placed in electrical communication with Video Display Device 40, will present two images. The first image represents the degraded signal which has been split and then combined. The left hand side of the image represents the Degraded Image 100a. The right hand side of the image represents the signal after having passed through the Video Compensator 80 and is shown is Image 80a. The third image, Image 60a, represents the reference signal generated by Second Test Generator 60.

While the present invention has been described and defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts.

The depicted and described preferred embodiment of the invention is exemplary only, and is not exhaustive of the scope of the invention. Consequently, the invention is intended to be limited only by the spirit and scope of the appended claims, giving full cognizance to equivalents in all respects. Specifically, those ordinarily skilled in the pertinent arts will recognize that the present invention, or its equivalents, is not limited to video signals, but can be used with any type of signals that can be visually represented and which degrade due to passing through components of a system.

What is claimed is:

1. A method for evaluating and compensating for degradation of an electrical signal caused by a circuit comprising the steps of:
   (a) placing a first electrical signal in communication with an input of the circuit;
   (b) passing said first electrical signal through the circuit thereby causing the circuit to output a degraded electrical signal;
   (c) providing an electrical compensation means having an input, an output, and adjustment controls, placing said degraded electrical signal in communication with the input of said electrical compensation means;
   (d) providing a means of synchronizing and combining electrical signals having at least a first and a second input and one output, placing the output of said electrical compensation means in communication with the first input of said means of synchronizing and combining electrical signals;
   (e) placing a second electrical signal, substantially identical to said first electrical signal, in communication with the second input of said means of synchronizing and combining electrical signals;
   (f) placing the output of said means of synchronizing and combining electrical signals in communication with a means for creating visual representations of electrical signals in a way that the visual representation of said degraded electrical signal and the visual representation of said second electrical signal are presented separate from each other and each representation is not altered by the representation of any other signals;
   (g) comparing said visual representation of said degraded image and the visual representation of said second electrical signal; and
   (h) Altering said adjustment controls of said compensation means so that the visual representation of said degraded signal is modified to resemble as closely as possible the visual representation of said second electrical signal.

2. A method for evaluating degradation of an electrical signal caused by a circuit as recited in claim 1, wherein one of the plurality of visual display means recited in said placing step f, is an oscilloscope.

3. A method for evaluating and compensating for the degradation of an electrical signal caused by a circuit as recited in claim 1 wherein one of the plurality of means for creating visual representations recited in step f is an oscilloscope.

4. A method for evaluating and compensating for the degradation of an electrical signal caused by a circuit as recited in claim 1, in which the electrical signal further comprises a video signal.

5. A method for evaluating and compensating for the degradation of an electrical signal caused by a circuit as recited in claim 1, in which the video signal further comprises a signal selected from a group consisting of NTSC, PAL, SECAM, and video signals generated by a computer.

6. A method for evaluating the degradation of an electrical signal caused by a circuit as recited in claim 1, wherein the placing step, as described in step (e), further comprises a means for adjusting each of the said visual representations so that each of the said visual representations can be displayed in a plurality of sizes, shapes and locations.

7. A method for evaluating and compensating for degradation of an electrical signal caused by a circuit comprising the steps of:
   (a) placing a first electrical signal in communication with an input of the circuit;
   (b) passing said first electrical signal through the circuit thereby causing the circuit to output a degraded electrical signal;
   (c) providing a signal splitting means having an input and at least a first and a second output, placing said degraded signal in communication with the input to said video splitting means;
   (d) providing a means of synchronizing and combining electrical signals having at least a first, a second, and a third input, and one output, placing the first output of said video splitting means in communication with the first input of said means of synchronizing and combining electrical signals;
   (e) providing a signal compensation means having an input, an output, and adjustment controls, placing the second output of said signal splitting means in communication with the input of said electrical compensation means whereby a recovered electrical signal is produced;
   (f) placing the output of said electrical compensation means in communication with the second input of said means of synchronizing and combining electrical signals;
   (g) placing a second electrical signal, substantially identical to said first electrical signal, in communication with the third input of said means of synchronizing and combining electrical signals;
   (h) placing the output of said means of synchronizing and combining electrical signals in communication with a means for creating visual representations of electrical signals in a way that the visual representation of the first input, the second input and the third input of said means of synchronizing and combining electrical signals are presented separate from each other and each representation is not altered by the representation of the other two;

(i) comparing said visual representation of said degraded signal, said visual representation of said recovered signal, and the visual representation of said second electrical signal; and, (j) Altering said adjustment controls of said compensation means so that the visual representation of said recovered image is modified to resembles as closely as possible the visual representation of said second electrical signal.

8. A method for evaluating and compensating for the degradation of an electrical signal caused by a circuit comprising the steps of:

(a) placing an electrical signal in communication with an input of the circuit;

(b) passing said electrical signal through the circuit thereby causing the circuit to output a degraded electrical signal;

(c) providing a signal splitting means having an input and at least a first and a second identical output, placing said degraded electrical signal in communication with said input of said signal splitting means whereby each of said first and said second outputs carries the degraded electrical signal;

(d) providing a signal combining means having at least a first and a second input and one output, placing said first output of said signal splitting means in communication with said first input of said signal combining means;

(e) providing a signal compensation means having an input, an output, and an adjustment means, placing said second output of said signal splitting means, which is conducting said degraded signal, in electrical communication with said input of said signal compensation means;

(f) passing said degraded signal through the signal compensation means thereby generating a recovered electrical signal;

(g) placing the output of said signal compensation means, which is conducting said recovered electrical signal, in communication with the second input of said signal combining means;

(i) placing the output of said signal combining means in communication with a plurality of means for creating visual representations of electrical signals in a way that the visual representation of said degraded electrical signal and the visual representation of said recovered electrical signal are presented separate from each other and each representation is not altered by the representation of any other signals;

(j) adjusting said recovered electrical signal with adjustment means of said signal compensation means while comparing concurrently said visual representation of said recovered electrical signal to said visual representation of said degraded electrical signal.

9. A method for evaluating and compensating for the degradation of an electrical signal caused by a circuit as recited in claim 8, wherein one of the plurality of means for creating visual representations recited in said placing step g, is an oscilloscope.

10. A method for evaluating and compensating for the degradation of an electrical signal caused by a circuit as recited in claim 8, in which the electrical signal further comprises a video signal.

11. A method for evaluating and compensating for the degradation of an electrical signal caused by a circuit as recited in claim 8, in which the video signal further comprises a signal selected from a group consisting of NTSC, PAL, SECAM, and video signals generated by computers or any other means.

\* \* \* \* \*